US008300888B2

(12) United States Patent
Chang et al.

(10) Patent No.: US 8,300,888 B2
(45) Date of Patent: Oct. 30, 2012

(54) IMAGE DISPLACEMENT DETECTION METHOD

(75) Inventors: Jin-Bang Chang, Hsin-Chu (TW); Wen-Tsun Tai, Hsin-Chu (TW)

(73) Assignee: Elan Microelectronics Corp., Hsin-Chu (TW)

( * ) Notice: Subject to any disclaimer, the term of this patent is extended or adjusted under 35 U.S.C. 154(b) by 911 days.

(21) Appl. No.: 12/124,777

(22) Filed: May 21, 2008

(65) Prior Publication Data

US 2009/0208133 A1 Aug. 20, 2009

(30) Foreign Application Priority Data

Feb. 19, 2008 (TW) ............................... 97105679 A

(51) Int. Cl.
*G06K 9/00* (2006.01)
*G06F 3/033* (2006.01)
*G09G 5/08* (2006.01)

(52) U.S. Cl. ........................................ 382/103; 345/166
(58) Field of Classification Search .................... None
See application file for complete search history.

(56) References Cited

U.S. PATENT DOCUMENTS

| 7,929,609 | B2* | 4/2011 | Riemens et al. | 375/240.16 |
| 2005/0232357 | A1* | 10/2005 | Hubrich et al. | 375/240.16 |
| 2007/0273653 | A1* | 11/2007 | Chen et al. | 345/166 |

* cited by examiner

*Primary Examiner* — Jason M Repko
*Assistant Examiner* — David F Dunphy
(74) *Attorney, Agent, or Firm* — Muncy, Geissler, Olds & Lowe, PLLC

(57) ABSTRACT

The present invention provides an image displacement detection method, which employs the center of a $1^{st}$ frame as a starting point, and the previous image displacement vector or the inversed direction displacement of the adjusted previous image displacement vector as the image matching reference block; next, proceeds the matching with the $2^{nd}$ frame to calculate the image displacement vector between the $1^{st}$ frame and the $2^{nd}$ frame. Thus, the method of the present invention can relatively increase about twice the maximum tracking speed of the sensor.

9 Claims, 10 Drawing Sheets

IMAGE DISPLACEMENT DETECTION METHOD

FIELD OF THE INVENTION

The present invention relates to an image displacement detection method, and particularly to an image displacement detection method applied to a sensor, such as the sensor used in an optical mouse, which can relatively increase about twice the max tracking speed of the sensor.

BACKGROUND OF THE INVENTION

The conventional block matching algorithm is to regularly select a block smaller than a $1^{st}$ frame at the center of the $1^{st}$ frame as a reference block; then, proceeding the matching search for a $2^{nd}$ frame based on the reference block. The matching method is to divide the $2^{nd}$ frame into separated blocks the same size as the reference block, so called the sample blocks; then, applying the Mean Absolute Difference (MAD) method or the Mean Square Error (MSE) method to calculate the approximation among each pixel; and, finding a sample block from the sample blocks having the optimized matching with the reference block, which is the block with the minimum value after calculation, so as to calculate the displacement vector of the image.

$$MAD(s) = \sum_{x=1}^{M} \sum_{y=1}^{M} |RB(x, y) - SB(x, y, s)|$$

$$MSE(s) = \sum_{x=1}^{M} \sum_{y=1}^{M} (RB(x, y) - SB(x, y, s))^2$$

where $RB(x, y)$ is the pixel value of the reference block; $SB(x, y, s)$ is the pixel value of the sample block; M is the size of the matching block; and, s is the sequence number of the sample block in the sample blocks. Hereinafter, the conventional image displacement detection method will be described with the embodiments.

FIG. 1A~1D are diagrams of the conventional image displacement detection methods. As shown in FIG. 1A, the size of the sensing array of the sensor is N*N, the size of the image matching reference block is M*M, the sampling frequency is f, and the actual side length of each pixel is L. The X-axis maximum displacement in x-axis direction is X_max=(N−M)÷2 pixels, and the Y-axis maximum displacement in y-axis direction is Y_max=(N−M)÷2 pixels. The maximum tracking speed of the conventional block matching method is (N−M)÷2×f×L (distance unit/second).

As shown in FIG. 1B, on the virtual desktop 10, the sensor moves from the upper left corner to the lower right corner, and respectively captures the continuous frames 12a~12c. As shown in FIG. 1C, the captured frames 12a~12c are respectively provided with the image features 14a~14d.

In order to detect the image displacement, a square block is taken at the center of the $1^{st}$ frame 12a as the image matching reference block, which surrounds the image feature 14a; then, starting from the upper left corner of the $2^{nd}$ frame 12b, the same method is used to take a subblock with the same size for matching to see if they are the same; and, in order to find the image displacement vector between the $1^{st}$ frame 12a and the $2^{nd}$ frame 12b, the search and matching procedure on the whole area of the $2^{nd}$ image 12b is conducted.

In the whole-area search and matching procedure, it is to take another subblock of the same size by moving the frame 12b a pixel to the right, and continuously search from the left to the right, from top to bottom and in sequence to proceed the MAD or MSE block computation to find out the most matched subblock, and further to find the image displacement vector S(−x, +y) between the $1^{st}$ frame 12a and the $2^{nd}$ frame 12b.

As shown in FIG. 1D, after individually matching with these subblocks, it can obtain a subblock mostly similar to the image matching reference block, and further obtain the image displacement vector S. The conventional block matching method employs the image matching reference block as the initial position (0, 0). If the position of the best matched subblock found relative to the image matching reference block is x pixels moving to the left, the image displacement vector is defined as "−x", and if it is x pixels moving to the right, the image displacement vector is defined as "+x", and if it is y pixels moving downward, the image displacement vector is defined as "−y", and if it is y pixels moving upward, the image displacement vector is defined as "+y". Therefore, for the obtained image displacement vector S(−x, +y), after the second time period, the center image feature 14a "□" of the $1^{st}$ frame 12a is moved x pixels to the left on the x axis, and y pixels upward on the y axis.

FIGS. 2A and 2B are other diagrams of the conventional image displacement detection method. As shown in FIG. 2A, on the virtual desktop 10, the sensor moves from the upper left corner to the lower right corner, and respectively captures the continuous frames 12a~12d. However, between the second continuous frame 12b and the third continuous frame 12c, a fast movement in an inertial direction suddenly happens to the sensor, and thus the captured image 12b and 12c is shown in FIG. 2B.

In FIG. 2B, the frame 12c is lack of the image feature 14b at the center of the frame 12b, thus in the conventional image displacement detection method the best matched subblock in the frame 12c cannot be found, neither can the image displacement vector.

The inventor of the present invention has viewed the improvement for the conventional image displacement detection method, and invented an image displacement detection method, which can relatively increase about twice the max tracking speed of the sensor.

SUMMARY OF THE INVENTION

The major object of the present invention is to provide an image displacement detection method, which improves the manner of selecting a reference block for image matching and can relatively increase about twice the maximum tracking speed of the sensor, and reduce the situation that the sensor is unable to detect image displacement during a fast movement.

For the object as described, the present invention providing an image displacement detection method applied to a sensor includes the following steps (A) to (D). Step (A) is to configure the X-axis displacement as the maximum X-axis displacement if the X-axis displacement of the previous image displacement vector is larger than the maximum X-axis displacement; and to configure the Y-axis displacement as the maximum Y-axis displacement if the Y-axis displacement of the previous image displacement vector is larger than the maximum Y-axis displacement. Step (B) employs the center position of the $1^{st}$ frame as the starting point to determine the center position of the M*M image matching reference block at the inversed direction of the previous image displacement vector. Step (C) is to proceed the search and matching for the $2^{nd}$ frame, so as to find a subblock the same with the image matching reference block in the $2^{nd}$ frame. Step (D) will calculate with the position of the subblock located in the $2^{nd}$ frame and the position of the image matching reference block located in the $1^{st}$ frame to obtain the current image displacement vector. Thus, the method of the present invention can relatively increase about twice the max tracking speed for the sensor.

BRIEF DESCRIPTION OF THE DRAWINGS

The purpose and the effects of the present invention may be best understood by those skilled in the art by referring to the following detailed description of the preferred embodiments and the accompanying drawings, wherein.

DETAILED DESCRIPTION OF THE INVENTION

Figure 1A:
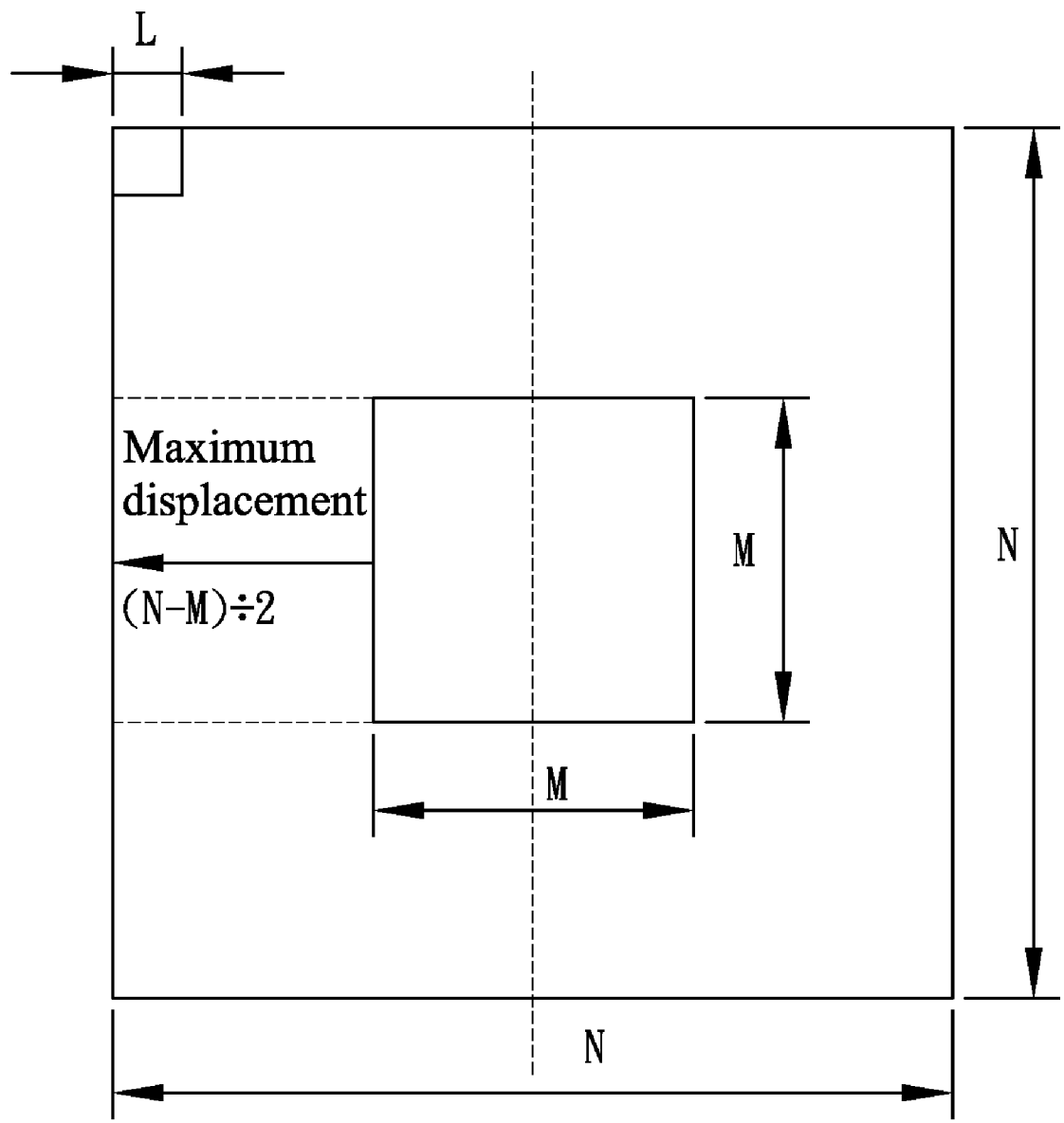
FIG. 1A~1D are the diagrams of the conventional image displacement detection method.
Figure 1B:
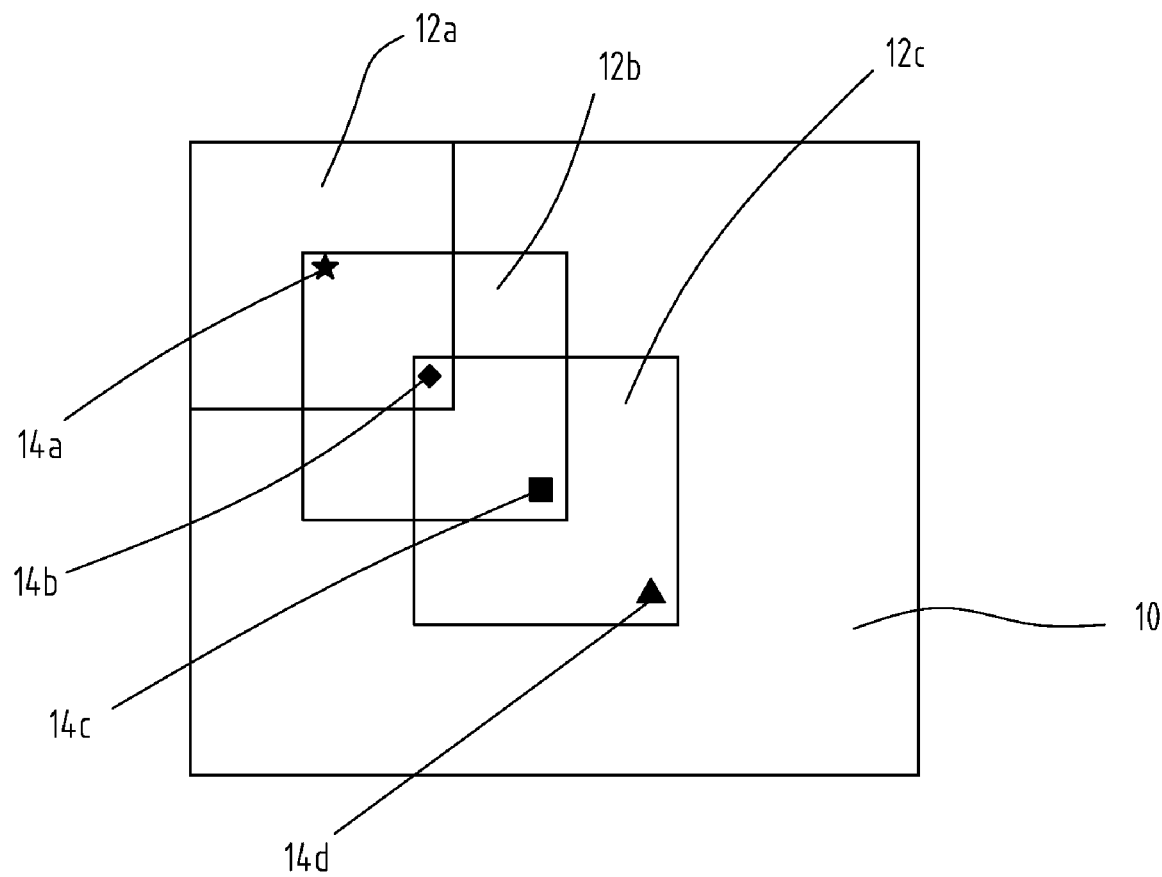
Figure 1C:
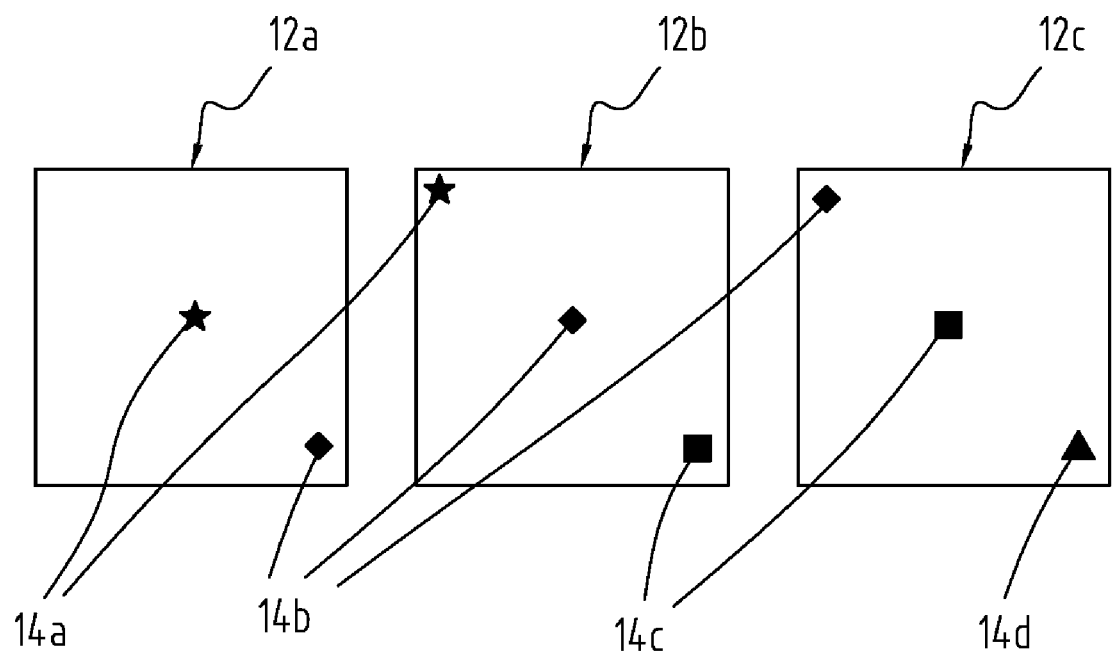
Figure 1D:
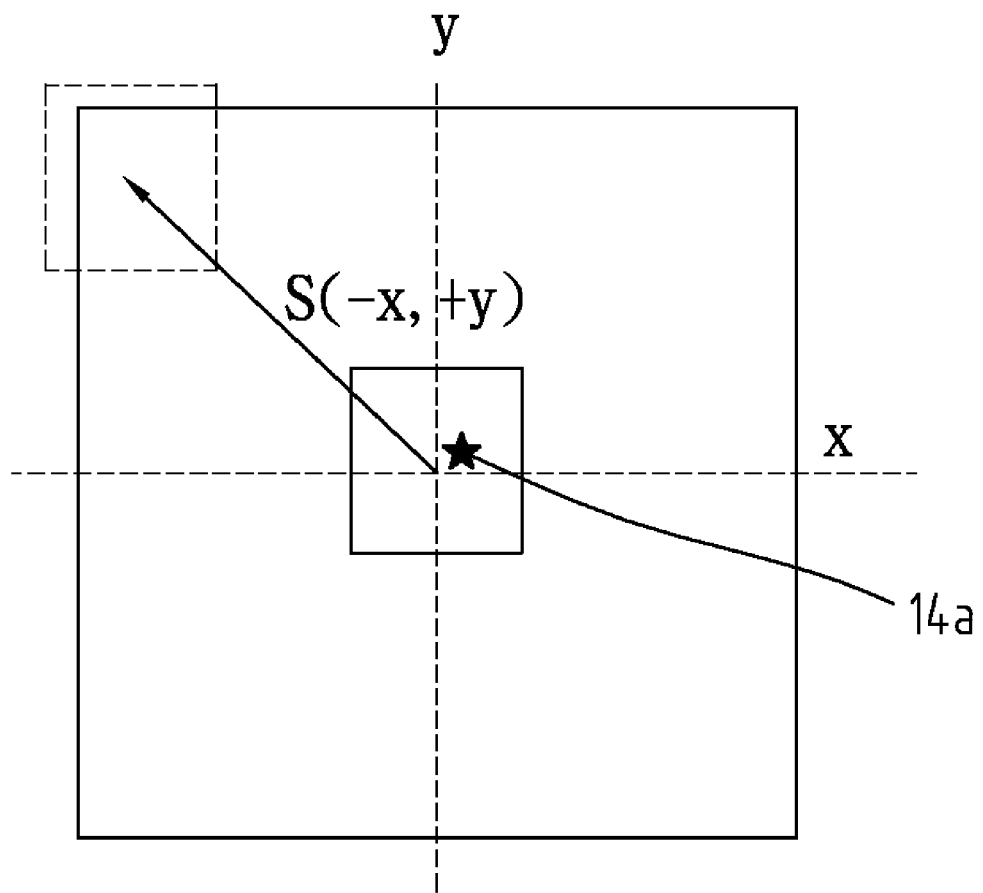
Figure 2A:
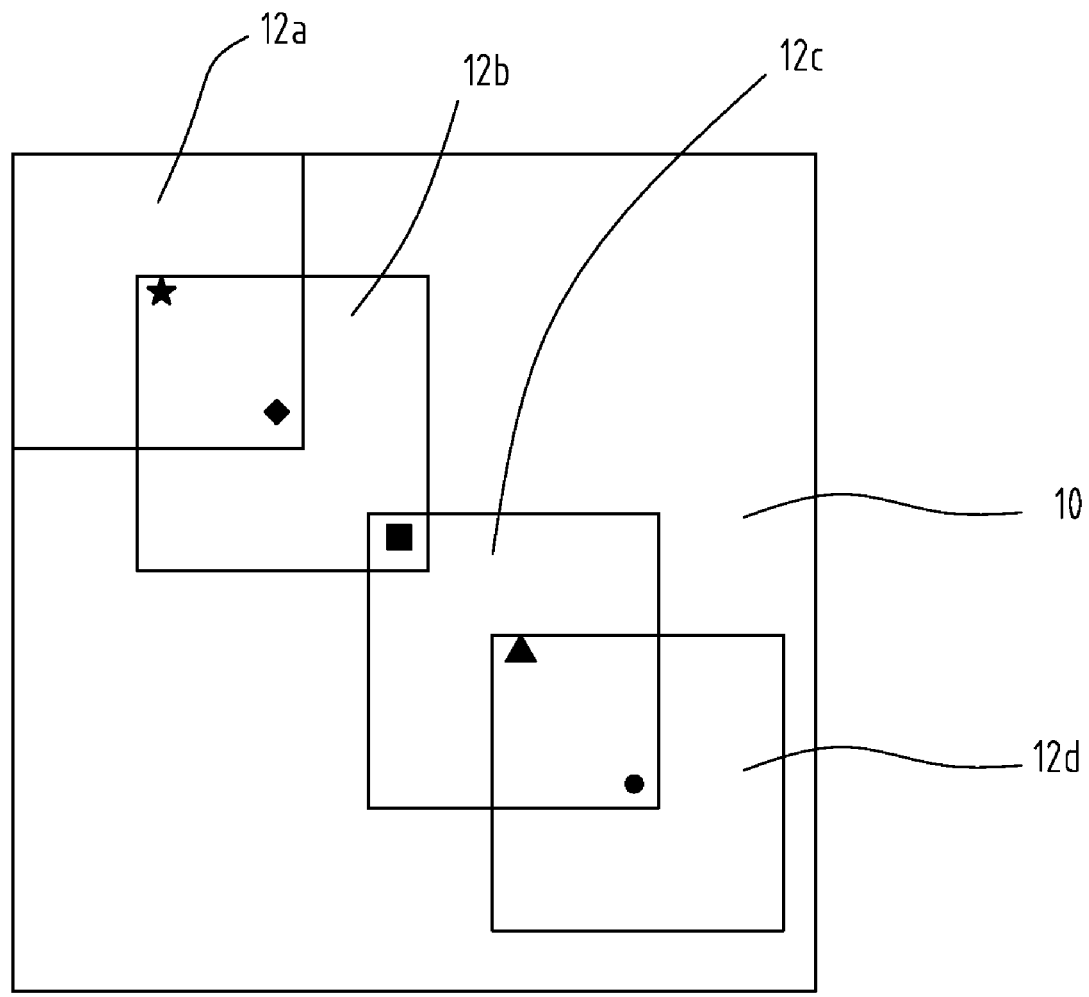
FIG. 2A~2B are other diagrams of the conventional image displacement detection method.
Figure 2B:
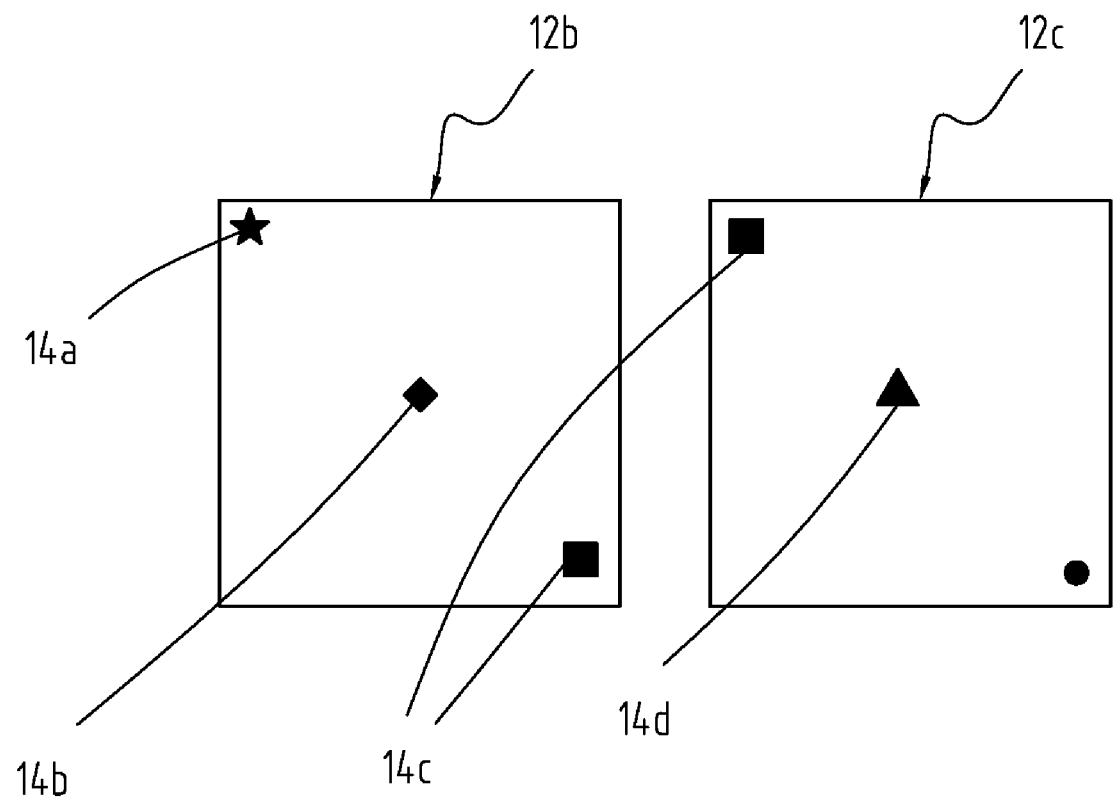
Figure 3A:
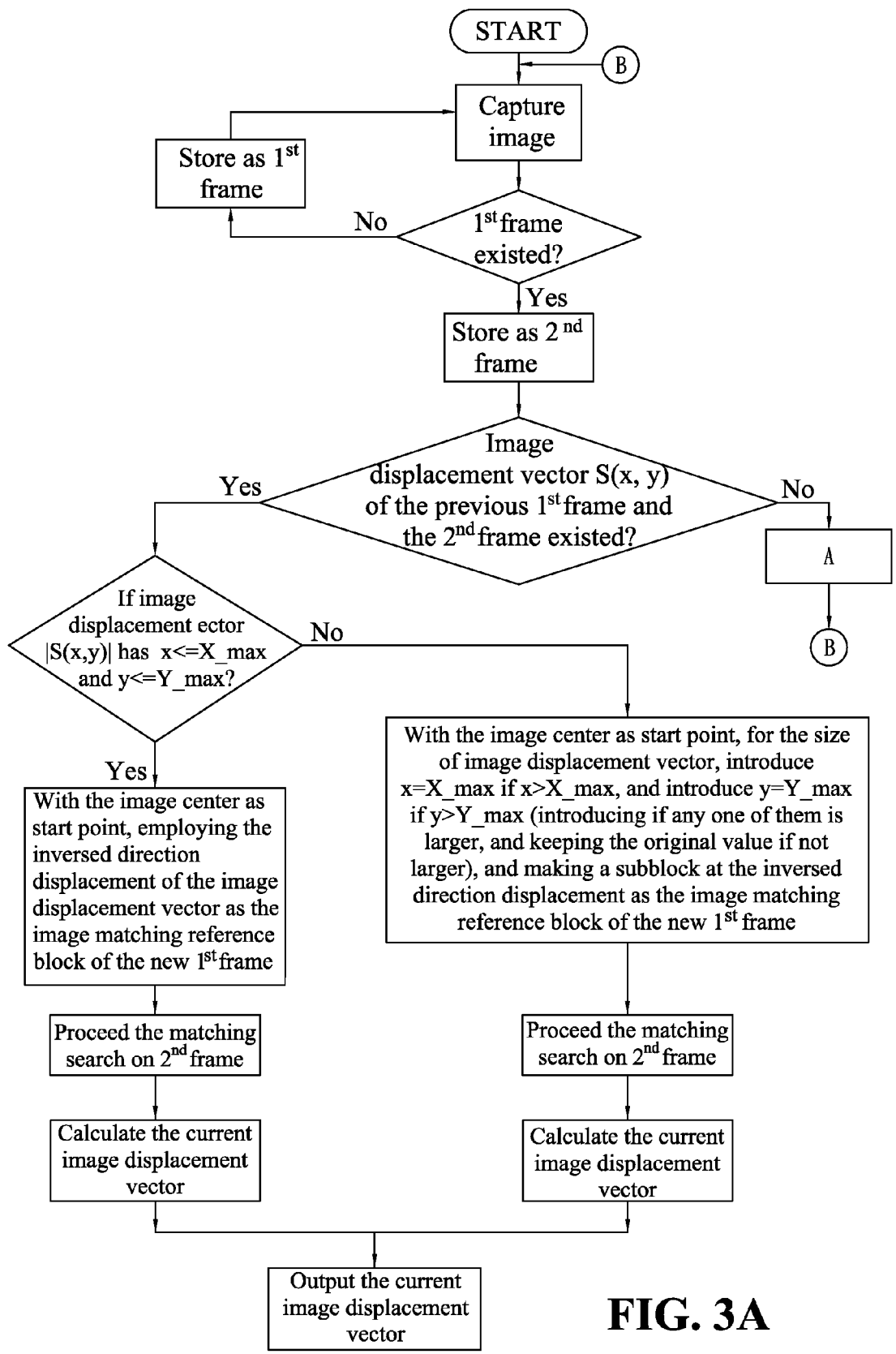
FIG. 3A~3B are flow charts of the image displacement detection method of the present invention.
Figure 3B:
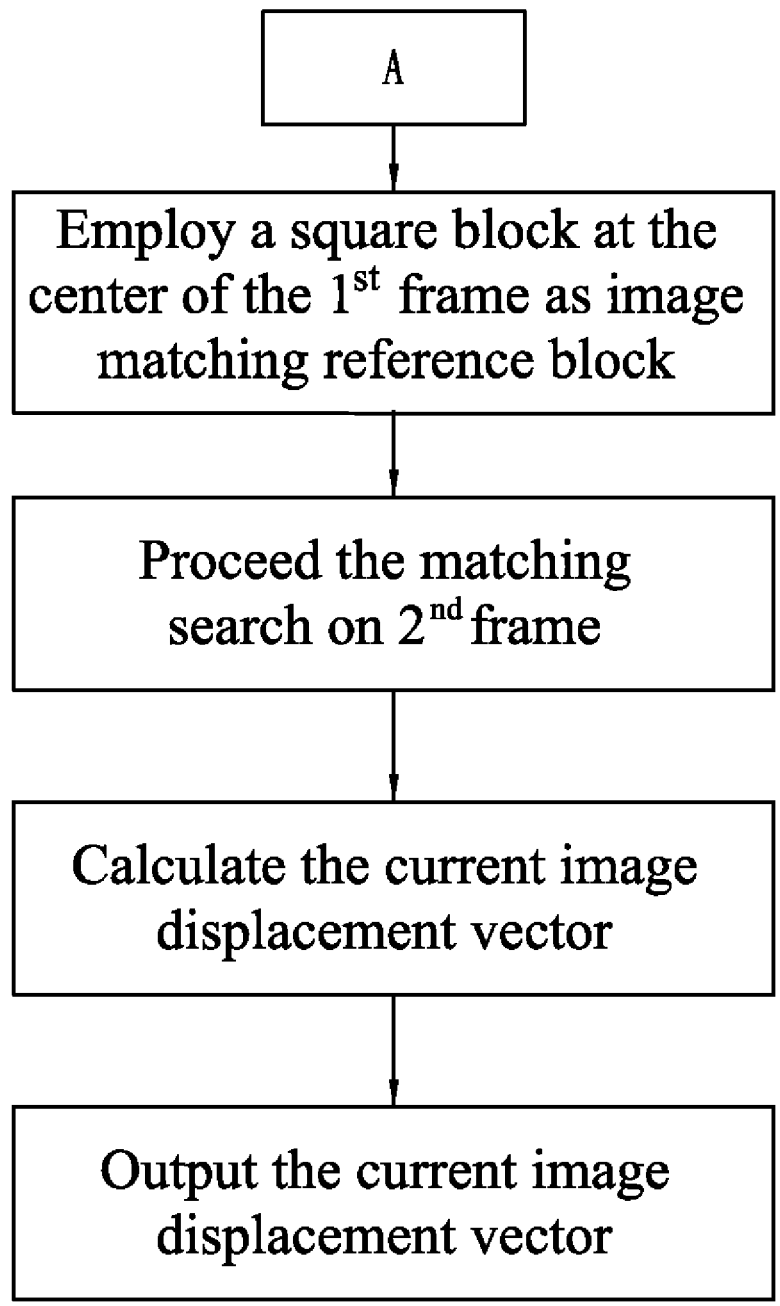

Referring to the process A in FIGS. 3A and 3B, under the same status shown in FIGS. 2A and 2B, since there is no previous image displacement vector existing at the beginning while conducting the first image displacement detection, a square block at the center of the $1^{st}$ frame 12a (i.e. the first continuous frame 12a) will be taken as the image matching reference block whose size can be M*M. Next, starting from the upper left corner of the $2^{nd}$ frame 12b (i.e. the second continuous frame 12b), an M*M subblock of the same size is taken to match with the image matching reference block to see whether they are matched (or the same). If they are not matched (or different), the method will move a pixel to the right, and take another M*M subblock to be matched with the image matching reference block to see if they are matched (or the same). With the same manner, each subblock taken in the entire $2^{nd}$ frame 12b from the left to the right and from the top to the bottom is computed with MAD or MSE, then the best matched (or the same) subblock can be found. Thus, the method can calculate and obtain the image displacement vector S between the $1^{st}$ frame 12a and the $2^{nd}$ frame 12b. The obtained image displacement vector S(−x, +y) by calculation is shown as FIG. 1D.

However, if the sensor suddenly moves fast toward an inertial direction between the second continuous frame 12b and the third continuous frame 12c, although the frame 12c is lack of the image feature 14b at the center of the frame 12b, with the image displacement detection method of the present invention, the image displacement vector between the second continuous frame 12b and the third continuous frame 12c can be calculated and obtained.

Figure 4:
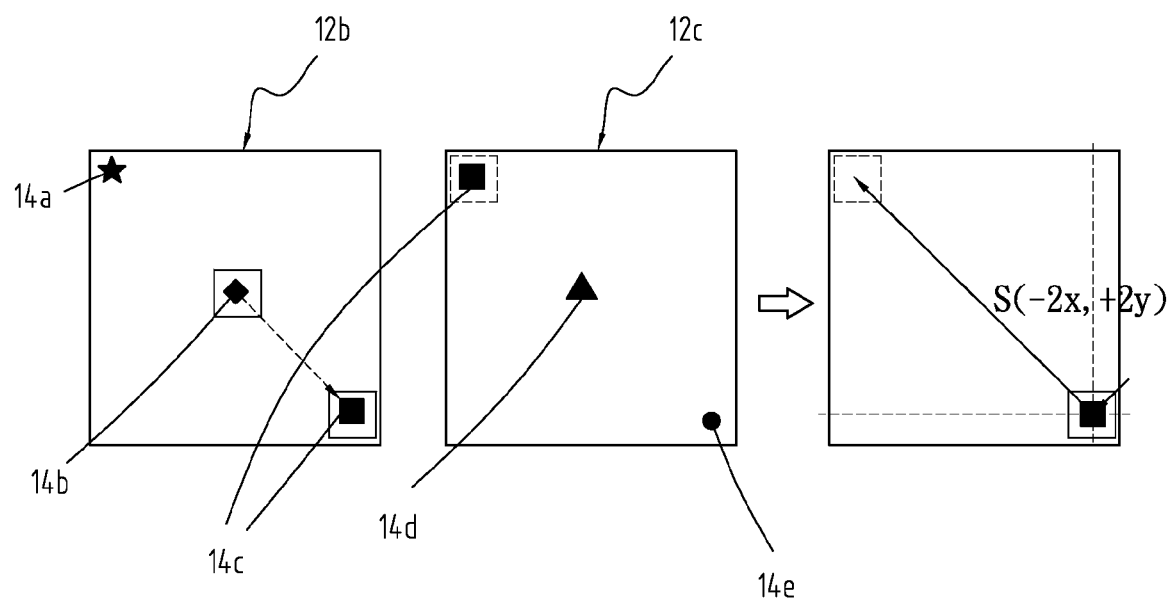
FIG. 4 is a diagram of the image displacement detection method of the present invention.

FIG. 4 is a schematic diagram of the image displacement detection method of the present invention. Taking the second continuous frame 12b and the third continuous frame 12c for example, the method of the present invention for obtaining the image displacement vector S between frames 12b and 12c will be referred to the flow blocks on the left of FIG. 3A. When the image displacement detection method of the present invention is checking the previous image displacement vector S(−x, +y) (i.e. image displacement vector S between frames 12a and 12b, as shown in FIG. 1D), if the x value of X-axis displacement is smaller than or equal to the maximum displacement on X-axis, and, at the same time, the y value of Y-axis displacement is smaller than or equal to the maximum displacement distance on Y-axis (i.e. x<=X_max, y<=Y_max), it will employ the center position of the $1^{st}$ frame 12b (i.e. the second continuous frame 12b) as the starting point, and determine the M*M image matching reference block (which surrounds the image feature 14c) at the inversed direction displacement of the previous image displacement vector S(−x, +y), which is labeled as the dashed line arrow in the frame 12b. The pixel labeled by the dashed line arrow is the center position of the M*M image matching reference block. In this example, the X-axis and Y-axis displacement of the previous image displacement vector S(−x, +y) are respectively smaller than or equal to the maximum displacement on X-axis and Y-axis. Therefore, the value of the previous image displacement vector S has not been changed.

Then, according to the image matching reference block, the $2^{nd}$ frame 12c (i.e. the third continuous frame 12c) will be proceeded with MAD or MSE block computation, and the best matched (or the same) subblock (surrounding the image feature 14c) will be found in the $2^{nd}$ frame 12c. Thus, we can calculate and obtain the image displacement vector S(−2x, +2y) between the $1^{st}$ frame 12b and the $2^{nd}$ frame 12c.

Figure 5:
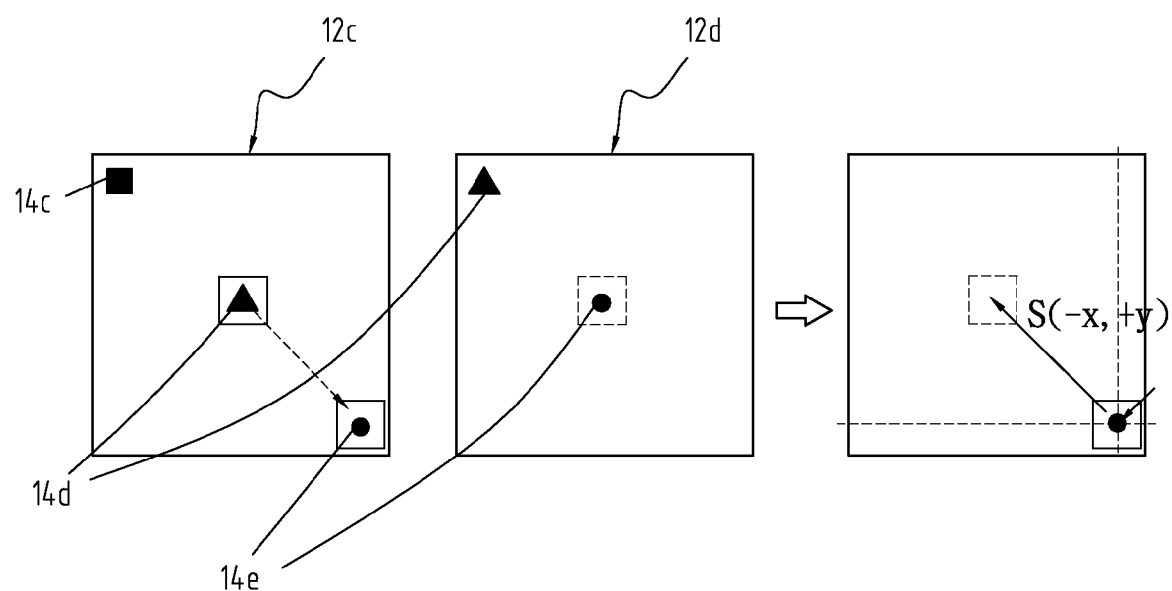
FIG. 5 is another diagram of the image displacement detection method of the present invention.

FIG. 5 is another diagram of the image displacement detection method of the present invention. Taking the third continuous frame 12c and the fourth continuous frame 12d for example, the way to employ the method of the present invention to obtain the image displacement vector S between the frames 12c and 12d can be referred to the flow blocks at the center in FIG. 3A. When using the image displacement detection method of the present invention to check the previous image displacement vector S(−2x, +2y)(i.e. the image displacement vector S between the frames 12b and 12c as shown in FIG. 4), if the fact that the X-axis displacement 2x is larger than the maximum displacement on X-axis is found, the X-axis displacement will be configured as the maximum displacement on X-axis (i.e. S(X-axis displacement, Y-axis displacement), and X-axis displacement=X_max); on the other hand, if the fact that the Y-axis displacement 2y is larger than the maximum displacement on Y-axis is found, the Y-axis displacement will be configured as the maximum displacement on Y-axis (i.e. S(X-axis displacement, Y-axis displacement), and Y-axis displacement=Y_max). In this example, the X-axis and Y-axis displacement of the previous image displacement vector S(−2x, +2y) will be respectively larger than the maximum displacement on X-axis and Y-axis. Thus, the original value of the previous image displacement vector S has been replaced.

Next, by employing the center position of the $1^{st}$ frame 12c (i.e. the third continuous frame 12c) as the starting point, the position of the inversed direction displacement of the previous image displacement vector S with a value changed, i.e. the position labeled by the dashed line arrow in the frame 12c, can be determined as the M*M image matching reference block (surrounding the image feature 14e), and the pixel labeled by the dashed line arrow will be the center position of the M*M image matching reference block.

Then, according to the image matching reference block, the $2^{nd}$ frame 12d (i.e. the fourth continuous frame 12d) will be proceeded with MAD or MSE block computation, and the best matched (or the same) subblock (surrounding the image feature 14e) will be found in the $2^{nd}$ frame 12d. Thus, we can calculate and obtain the image displacement vector S(−x, +y) between the $1^{st}$ frame 12c and the $2^{nd}$ frame 12d.

Based on the above-mentioned method of the present invention, the relative maximum tracking speed=(N−M)×f×L (distance unit/second) can be estimated, so that, under the same cost for the sensor, by the improvement of the conventional image displacement detection method, the method of the present invention can relatively increase about twice the Max Tracking Speed for the sensor, which is the advantage and benefit improved in the present invention.

The detailed description of the preferred embodiments as above is used to further clearly describe the features and spirit of the present invention, but the above-mentioned disclosed preferred embodiments are not used to limit the scope of the present invention. On the opposite, the object is to encompass all kinds of changes and equivalent arrangement within the scope of the present invention to be claimed.

What is claimed is:

1. An image displacement detection method, comprising the following steps:
   (A) capturing an image by an sensor of an optical mouse;
   (B) determining if a first frame exists, if so, storing the image of the step (A) as a second frame, and entering the step (C) for next execution; if not, storing the image of the step (A) as a first frame, and then returning to the step (A);
   (C) determining if a previous image displacement vector exists, if so, entering the step (D); if not, executing the following steps:
      (c1) determining a center position of an M*M image matching reference block with a center position of the first frame, wherein M>0;
      (c2) proceeding a search and matching on the second frame so as to find a best matched or a same subblock with the image matching reference block;
      (c3) calculating and obtaining a current image displacement vector based on a position of the subblock located in the second frame and a position of the image matching reference block located in the first frame, and then returning to the step (A);
   (D) determining if an X-axis displacement of the previous image displacement vector is smaller than or equal to a maximum displacement on X-axis, and if a Y-axis displacement of the previous image displacement vector is smaller than or equal to a maximum displacement on Y-axis, if so, entering the step (E1) for next execution, if not, entering the step (F1) for next execution;
   (E1) using the center position of the first frame as a starting point to determine the center position of the M*M image matching reference block with an inversed direction displacement of the previous image displacement vector;
   (E2) proceeding the search and matching on the second frame so as to find the best matched or the same subblock with the image matching reference block in the second frame;
   (E3) calculating to obtain the current image displacement vector based on the position of the subblock located in the second frame and the position of the image matching reference block located in the first frame, and then returning to the step (A);
   (F1) if the X-axis displacement of the previous image displacement vector is larger than the maximum displacement on X-axis, the X-axis displacement will be configured to be equal to the maximum displacement on X-axis; and if the Y-axis displacement of the previous image displacement vector is larger than the maximum displacement on Y-axis, the Y-axis displacement will be configured to be equal to the maximum displacement on Y-axis;
   (F2) employing the center position of the first frame as the starting point, and determining the center position of the M*M image matching reference block with the inversed direction displacement of the previous image displacement vector completed in the step (F1);
   (F3) proceeding the search and matching on the second frame so as to find the best matched or the same subblock with the image matching reference block in the second frame;
   (F4) calculating to obtain the current image displacement vector based on the position of the subblock located in the second frame and the position of the image matching reference block located in the first frame, and then returning to the step (A);
   wherein the current image displacement vector is successive in time to the previous image displacement vector.

2. The image displacement detection method according to claim 1, wherein the values of the maximum displacement on X-axis and the maximum displacement on Y-axis are determined respectively based on the sensor.

3. The image displacement detection method according to claim 1, wherein the maximum displacement on X-axis and the maximum displacement on Y-axis are both stored as (N−M)/2, in which an N*N array is a magnitude of a sensing array in the sensor, and M is smaller than N.

4. An image displacement detection method, comprising the following steps:
   (A) capturing continuous frames by a sensor of an optical mouse;
   (B) if an X-axis displacement of a previous image displacement vector is larger than a maximum displacement on X-axis, the X-axis displacement will be configured as the maximum displacement on X-axis; and, if a Y-axis displacement of a previous image displacement vector is larger than a maximum displacement on Y-axis, the Y-axis displacement will be configured as the maximum displacement on Y-axis;
   (C) using a center position of a first frame as a starting point to determine a center position of an M*M image matching reference block with an inversed direction displacement of the previous image displacement vector completed in the step (B);
   (D) proceeding a search and matching on a second frame next to the first frame, so as to find a best matched or a same subblock with the image matching reference block in the second frame;
   (E) calculating to obtain a current image displacement vector based on a position of the subblock located in the second frame and a position of the image matching reference block located in the first frame;
   wherein the current image displacement vector is successive in time to the previous image displacement vector.

5. The image displacement detection method according to claim 4, wherein the maximum displacement on X-axis and the maximum displacement on Y-axis have values determined respectively based on the sensor.

6. The image displacement detection method according to claim 4, wherein the maximum displacement on X-axis and the maximum displacement on Y-axis are both stored as (N−M)/2, in which an N*N array is a magnitude of a sensing array in the sensor, and M is smaller than N.

7. An image displacement detection method, comprising the following steps:
   (A) capturing continuous frames by a sensor of an optical mouse;
   (B) using a center position of a first frame as a starting point to determine a center position of an M*M image matching reference block with an inversed direction displacement of a previous image displacement vector;

(C) proceeding a search and matching on a second frame next to the first frame so as to find a best matched or a same subblock with the image matching reference block in the second frame;

(D) calculating to obtain a current image displacement vector based on a position of the subblock located in the second frame and a position of the image matching reference block located in the first frame;

wherein the current image displacement vector is successive in time to the previous image displacement vector.

8. The image displacement detection method according to claim 7, wherein the maximum displacement on X-axis and the maximum displacement on Y-axis have values determined respectively based on the sensor.

9. The image displacement detection method according to claim 7, wherein the maximum displacement on X-axis and the maximum displacement on Y-axis are both stored as (N−M)/2, in which an N*N array is a magnitude of a sensing array in the sensor, and M is smaller than N.

* * * * *